US005732578A

United States Patent [19]

Kang

[11] Patent Number: 5,732,578

[45] Date of Patent: Mar. 31, 1998

[54] DEVICE FOR MAINTAINING THE HORIZONTALITY OF A DOOR LOCK LEVER

[75] Inventor: Euoe Sik Kang, Taegu, Rep. of Korea

[73] Assignee: Hyundai Metal Co., Ltd., Seo-Gu, Rep. of Korea

[21] Appl. No.: 598,272

[22] Filed: Feb. 8, 1996

[30] Foreign Application Priority Data

Feb. 24, 1995 [KR] Rep. of Korea ........................ 95-3570

[51] Int. Cl.[6] ............................ E05B 13/10; B60P 25/02

[52] U.S. Cl. ......................... 70/224; 292/336.3; 292/357; 292/348; 70/451; 70/466

[58] Field of Search ................................ 292/348, 336.3, 292/357, 358, 353, 349; 70/224, 451, 466

[56] References Cited

U.S. PATENT DOCUMENTS

| | | | |
|---|---|---|---|
| 4,502,720 | 3/1985 | Fayerman et al. | 292/348 |
| 4,604,879 | 8/1986 | Neary et al. | 292/348 |
| 4,920,773 | 5/1990 | Surko, Jr. | 70/224 |
| 4,921,289 | 5/1990 | Shen | 292/357 |
| 5,118,152 | 6/1992 | Lin | 292/357 |
| 5,265,924 | 11/1993 | Kim | 292/357 |
| 5,286,074 | 2/1994 | Lin | 292/357 |
| 5,564,296 | 10/1996 | Theriault et al. | 292/348 |

FOREIGN PATENT DOCUMENTS

| | | | |
|---|---|---|---|
| 0526409 | 2/1993 | European Pat. Off. | 292/357 |
| 0583952 | 2/1994 | European Pat. Off. | 292/348 |
| 631092 | 10/1949 | United Kingdom | 292/348 |
| 2026589 | 2/1980 | United Kingdom | 292/353 |

*Primary Examiner*—Darnell M. Boucher
*Attorney, Agent, or Firm*—Banner & Witcoff, Ltd.

[57] ABSTRACT

A lever assembly for a door lock which permits simplified assembly is provided. The lever assembly comprises a lock body cylinder, a lock shank with an inside portion and an outside portion extending from either side of the body cylinder and a series of components assembled to the outside portion of the lock shank with aligned central apertures to receive the lock shank. A retainer is operatively coupled to the body cylinder, and an annular outer plate is rigidly attached to the outside portion of the lock shank by mating internal and external threads. The retainer and annular outer plate are provided with mating elements disposed at different distances from a center point to allow for blink assembly of the two by rotation relative to one another. A leaf spring and actuator plate are coupled to the said outer plate with two outside cover pieces attached to the lever assembly. A door lever is mounted to the cover pieces and includes an inwardly directed shaft that is rigidly coupled to the actuating plate for imparting the rotation motion of the lever to the plate.

2 Claims, 5 Drawing Sheets

DEVICE FOR MAINTAINING THE HORIZONTALITY OF A DOOR LOCK LEVER

BACKGROUND OF THE INVENTION

1. Field of the Invention

The present invention relates to a device for maintaining the horizontality of a door lock lever, which is provided in the end of the door lock lever to return the door lock lever to an original position and to prevent the door lock lever from drooping. More particularly, the present invention relates to a device for maintaining the horizontality of a door lock lever, which has a compact structure and can be easily assembled, thereby reduce manufacturing cost and shorten assembling time.

2. Description of the Prior Art

As well known in the art, a device for maintaining the horizontality of a door lock lever of the prior art includes plates which are formed by die casting process, and the plates are formed with several recesses and engagement portions into which an actuating spring and an actuating plate are received or engaged. For this reason, the number of parts needed to fabricate the device is caused to be increased, and the structure of the device is caused to be complicated. Accordingly, when manufacturing a door lock using the device for maintaining the horizontality of a door lock lever of the prior art, manufacturing cost will be increased due to the die casting process and assembling operations are complex.

The assembling operation of the device for maintaining the horizontality of a door lock lever must be accomplished in a specified direction. However, as the device of the prior art is not provided with means for correctly establishing the specified direction, the assembling process cannot help but depend upon experience of an assembler, and it takes lots of time to assemble the device.

SUMMARY OF THE INVENTION

Accordingly, the present invention has been made in view of the above-described problems occurring in the prior art, and an object of the present invention is to provide a device for maintaining the horizontality of a door lock lever, which has a compact structure and can be easily assembled, thereby reducing manufacturing cost and shortening assembling time.

According to one aspect of the present invention, there is provided a device for maintaining the horizontality of a door lock lever suitable for returning the door lock lever and preventing the door lock lever from drooping, the device comprising:

a door lock body having shaft portions provided in both end surfaces thereof, the outer shaft portion having an externally threaded portion formed on the circumferential surface thereof;

an outer plate fitted onto the externally threaded portion of the door lock body, and having two projections spaced each other and at least two locking lips;

a leaf spring member seated onto the outer surface of the outer plate, curved into an annular shaped configuration, and having two bent portions which are formed in both ends thereof, respectively;

an actuating plate provided in the outside of the leaf spring member, and having a supporting portion for supporting the leaf spring member, two projections which are spaced each other and are intervened between the projection of the outer plate and the leaf spring member, respectively, and a stopper projection which is formed in a space defined in a center portion thereof and radially inwardly extends;

an inner cover provided in the outside of the actuating plate and having at least two locking pieces respectively locked into the locking lips of the outer plate; and a door lock lever extending through the actuating plate and the inner cover, and having slit into which the stopper projection of the actuating plate is fitted.

According to another aspect of the present invention, the outer plate is formed with two holes which are separated from the center of the outer plate by a different distance; the device further includes an actuating piece seated onto the inner surface of the outer plate and a spring seated onto the inner surface of the actuating piece; and the actuating piece is formed with two protrusions which are engaged into the holes of the outer plate, respectively and are separated from the center of the actuating piece by a different distance.

According to still another aspect of the present invention, the outer plate is manufactured by pressing a steel plate.

By the above features of the present invention, since the plates are manufactured by pressing steel plates and only when the door lock body and the door lock lever are aligned in a desired position, the protrusion of the actuating piece can be engaged into the hole of the outer plate; the device for maintaining the horizontality of a door lock lever in accordance with the present invention not only has a compact structure, but also effectively maintains the door lock lever 30 in a horizontal position, whereby it is convenient to assemble the door lock and the manufacturing cost is lowered.

BRIEF DESCRIPTION OF THE DRAWINGS

The above object, and other features and advantages of the present invention will be more apparent after a reading of the following detailed description taken in conjunction with the drawings, in which.

DETAILED DESCRIPTION OF THE PREFERRED EMBODIMENT

Hereinafter, a device for maintaining the horizontality of a door lock lever in accordance with an embodiment of the present invention will be described with reference to the drawings.

Figure 1:
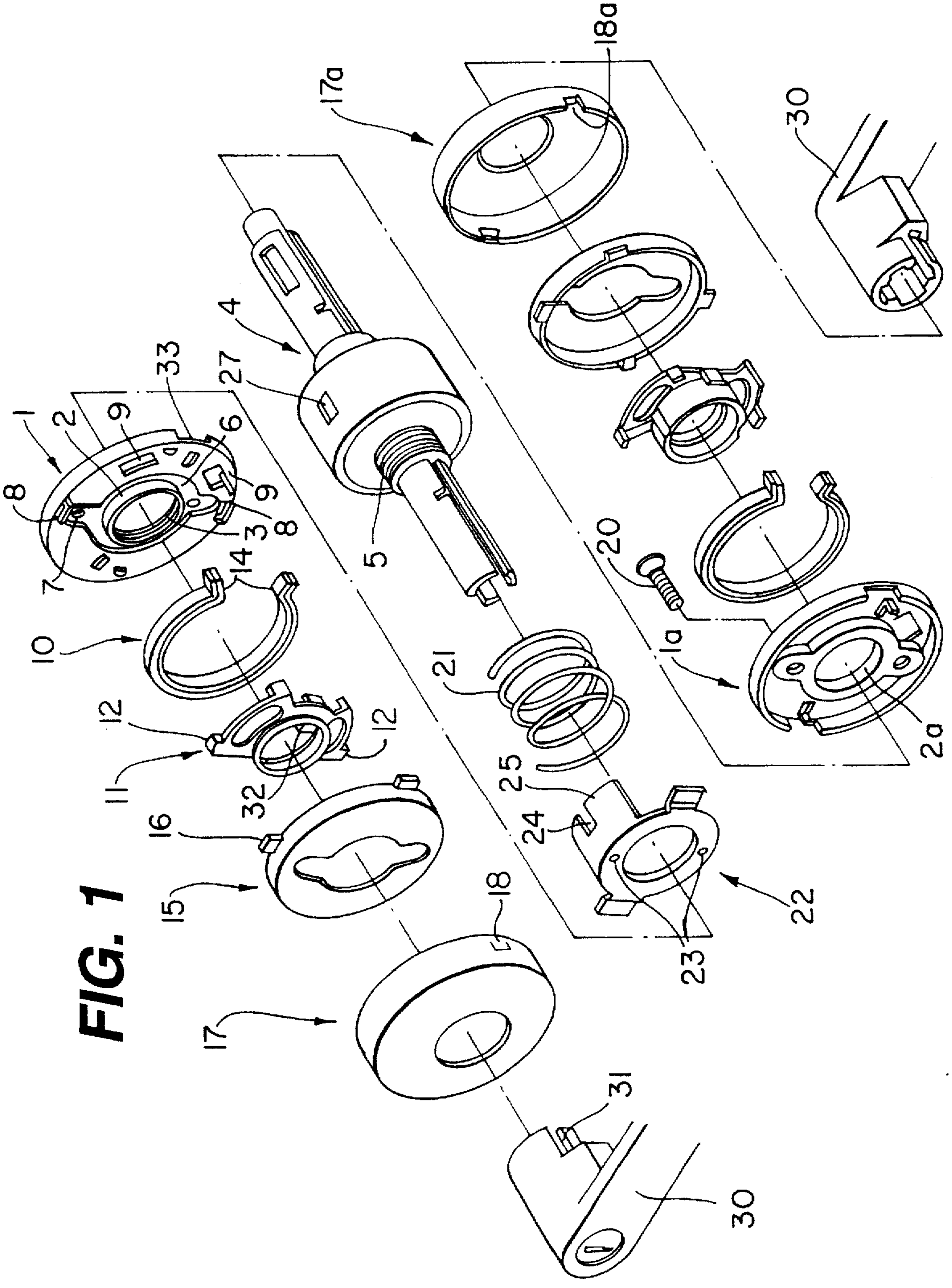
FIG. 1 is an exploded perspective view illustrating the entire structure of a device for maintaining the horizontality of a door lock lever in accordance with an embodiment of the present invention.
Figure 2:
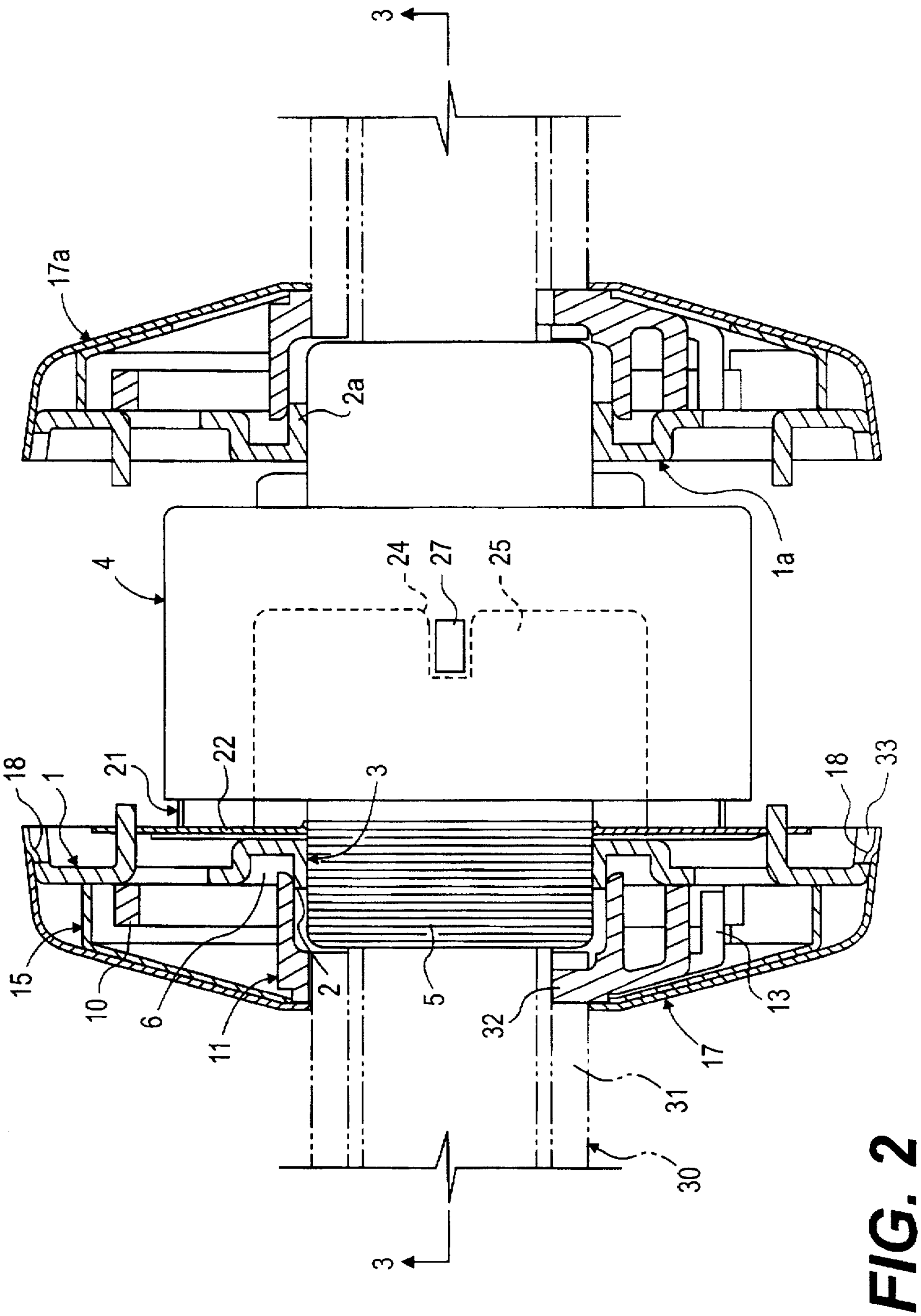
FIG. 2 is a cross-sectional view illustrating the device of FIG. 1 in an assembled state.

FIG. 1 is an exploded perspective view illustrating the entire structure of a device for maintaining the horizontality of a door lock lever in accordance with an embodiment of the present invention. As shown in FIG. 1, a device for maintaining the horizontality of a door lock lever includes a door lock body 4, an outer plate 1, a leaf spring 10, an actuating plate 11, an inner cover 15 and an outer cover 17.

A door lock body 4 has a column shaped configuration, and a shaft portion is provided on the respective end surfaces of the door lock body 4. On the circumferential surface of the outer shaft portion of the door lock body 4, there is formed with an externally threaded portion 5. An inner space which is opened toward the outer end surface is defined in the respective upper part and the lower part of the door lock body 4, and an engaging projection 27 which inwardly projects toward the inner space is formed in the respective upper end and lower ends of the door lock body 4.

An outer plate 1 is fitted onto the outer shaft portion of the door lock body 4, and is manufactured by pressing a steel plate. The center portion of the outer plate 1 is provided with a tube portion 2, and an internally threaded portion 3 is formed on the inner surface of the tube portion 2. The internally threaded portion 3 is engaged with the externally threaded portion 5 formed on the outer shaft portion of the door lock body 4 to fasten the outer plate 1 to the outer shaft portion of the door lock body 4. In the vicinity of the tube portion 2, a recess 6 is formed on the outer surface of the outer plate 1; and a pair of holes 7 are defined adjacent the upper and lower ends of the outer plate 1, respectively. The pair of holes 7 are separated from the center of the outer plate 1 by a different distance. A locking lip 8 is formed on the upper and lower parts of the respective hole 7 in an oppositely bent manner. Beside the recess 6, two projections 9 are formed on the outer plate 1, and the two projections 9 are spaced with respect to one another at an acute angle. A pair of engaging grooves 33 are oppositely defined in the side wall portion of the outer plate 1.

An actuating plate 11 is seated onto the outer plate 1, and a leaf spring 10 is intervened between the outer plate 1 and the actuating plate 11. The respective upper and lower portions of the actuating plate 11 is formed with a leaf spring supporting portion 12, and a pair of flanges 13 are formed on the side portion of the actuating plate 11 in a manner that are spaced each other by the angle between the projections 9 of the outer plate 1. As best shown in FIG. 1, the leaf spring 10 consists of two leaf spring members which are combined each other, and is curved into an annular shaped configuration. Both ends of the leaf spring 10 are formed with a bent portion 14, respectively. The leaf spring 10 is maintained between the outer plate 1 and the actuating plate 11 by the leaf spring supporting portion 12 of the actuating plate 11, and the respective bent portion 14 biases the flange 13 of the actuating plate 11 against the projection 9 of the outer plate 1. The bent portion 14 of the leaf spring 10 functions to prevent the actuating plate 11 from being detached from the leaf spring 10 when the actuating plate 11 rotates. On the inner wall of the center hole of the actuating plate 11, there is formed with a stopper projection 32 in a radially inwardly projecting manner.

An inner cover 15 is disposed on the outer part of the actuating plate 11, and a locking piece 16 is formed at the respective upper and lower ends of the inner cover 15 in a radially outwardly projecting manner. By rotating the inner cover 15 to engage the locking piece 16 into the locking lip 8 formed in the outer plate 1, the inner cover 15 is fixed to the outer plate 1.

An outer cover 17 is disposed on the outer part of the inner cover 15, and a pair of engaging lips 18 are oppositely formed in the side wall of the outer plate 17. By engaging the engaging lip 18 with the wall surface of the engaging groove 33 defined in the outer plate 1, the outer plate 17 is fixed to the outer plate 1.

The above mentioned constructions fall within the outer section of a door, and the constructions of the inner section of the door which are different from that of the outer section will be described in below. The inner surface of a tube portion 2*a* provided in an inner plate 1*a* is not formed with an internally threaded portion, but the inner plate 1*a* is fastened to the door lock body 4 by a screw 20. The end of an engaging lip 18*a* which is formed in an outer plate 17*a* is opened, and by bending the engaging lip 18*a* by a tool such as a screw driver, the outer cover 17*a* can be disassembled from the door lock body 4.

An actuating piece or retainer 22 is seated onto the inner surface of the outer plate 1, and a spring 21 is seated onto the inner surface of the actuating piece 22. Two protrusions 23 are formed in the outer surface of the actuating piece 22, and the protrusions 23 are separated from the center of the actuating piece 22 in a different distance. An inserting portion 25 is integrally made into the edge portion of the actuating piece 22, and the inserting portion 25 axially extends toward the door lock body 4. A cut-out portion 24 is defined in the inserting portion 25. The cut-out portion 24 is fitted by the engaging projection 27 formed in the door lock body 4.

Figure 3:
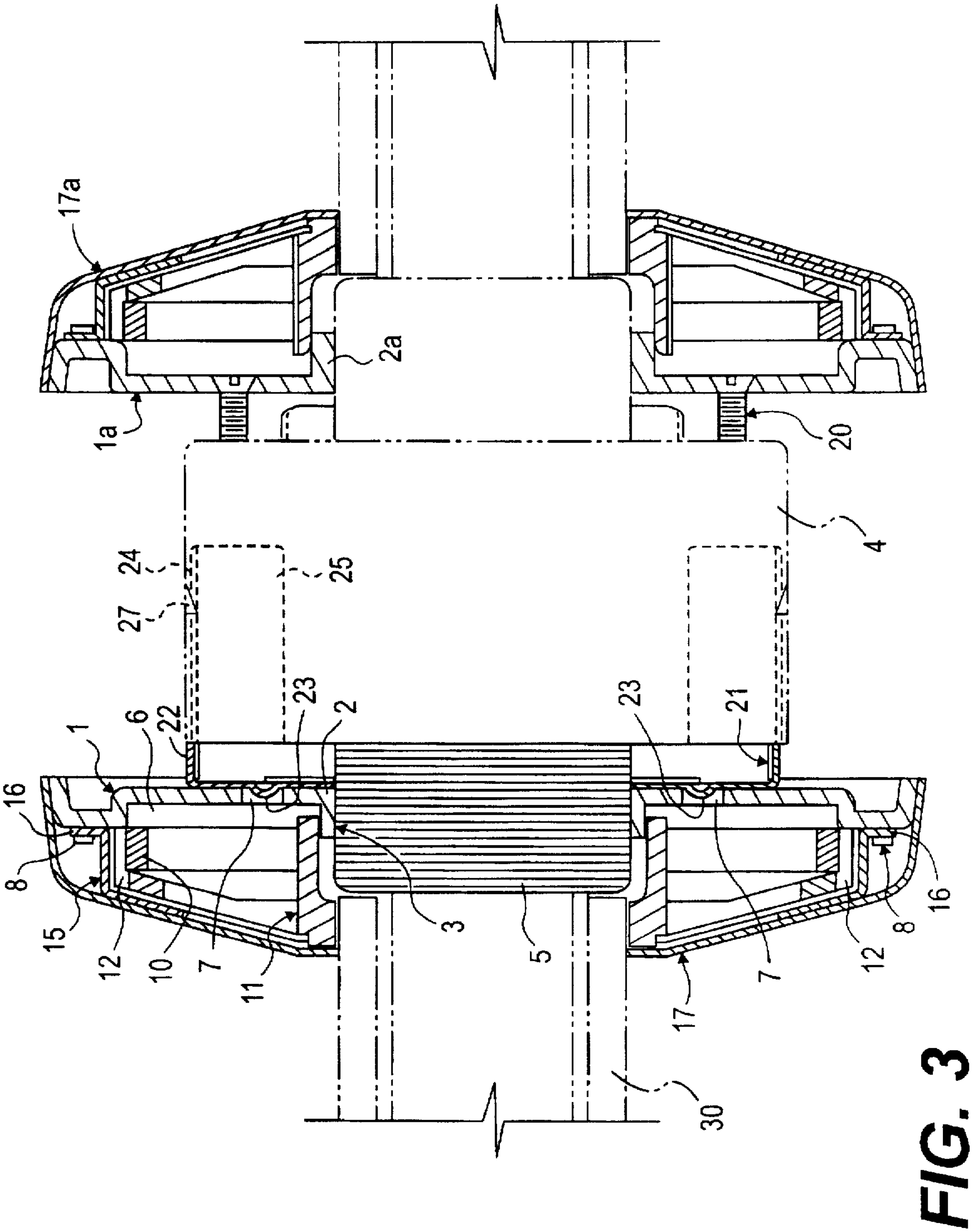
FIG. 3 is a cross-sectional view taken along the line 3—3 of FIG. 2.
Figure 5:
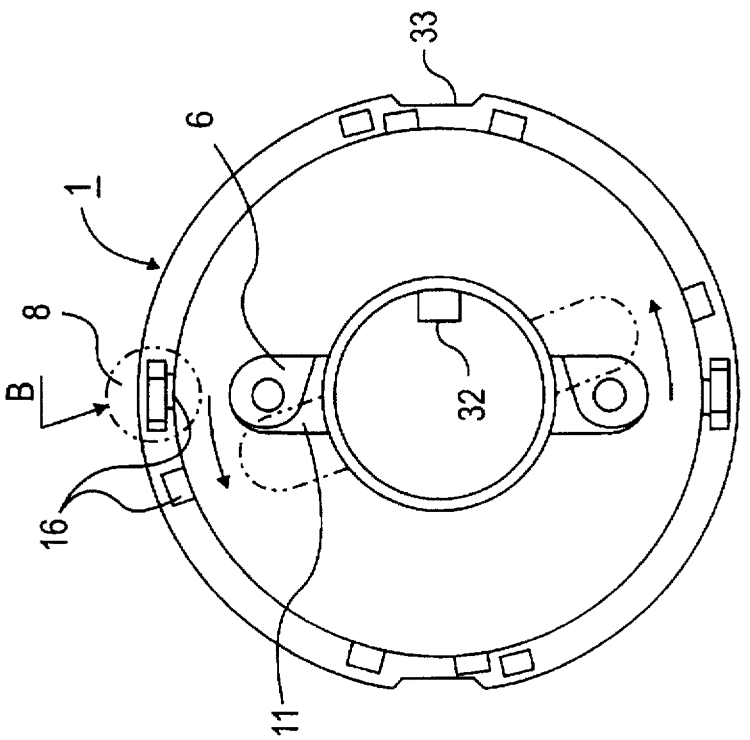
FIG. 5 is a side view illustrating the state in which an inner cover is added to the assembly of FIG. 4.
Figure 4:
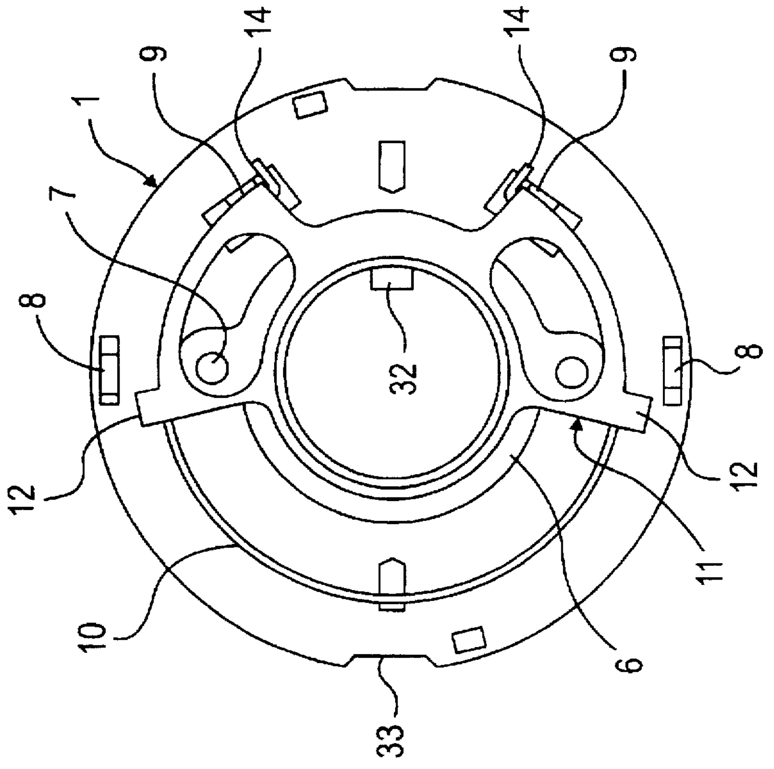
FIG. 4 is a side view illustrating an outer plate, a leaf spring and an actuating plate in an assembled state.
Figure 7B:
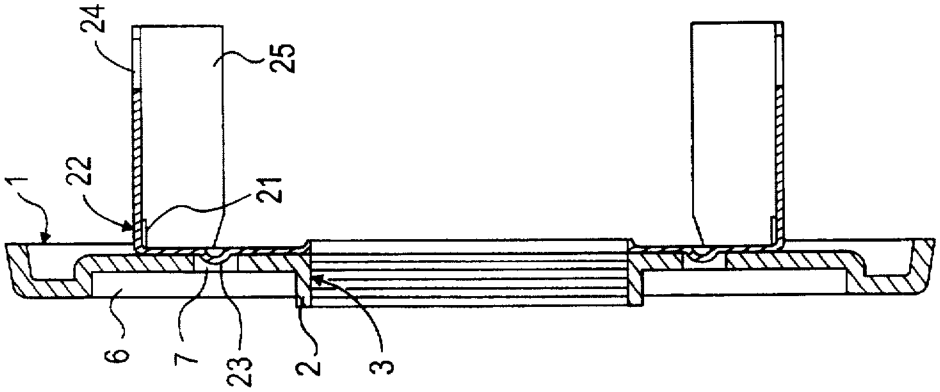
FIGS. 7(A) and 7(B) are cross-sectional views illustrating the manner by which an actuating piece is engaged into the outer plate.
Figure 7A:
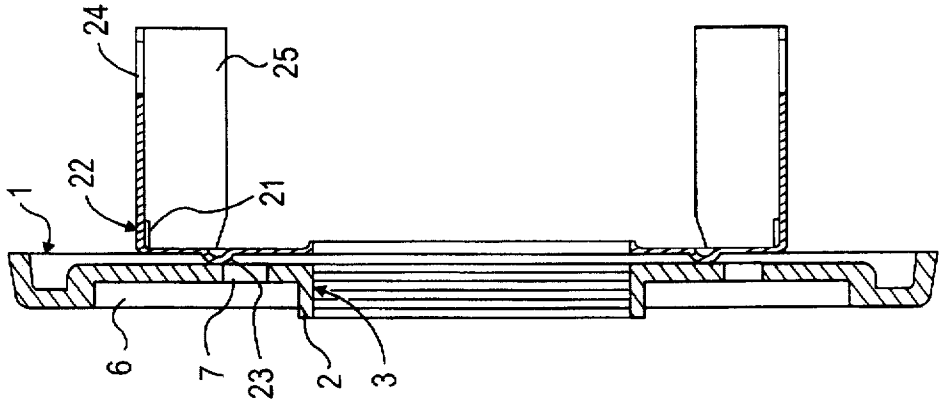
Figure 6:
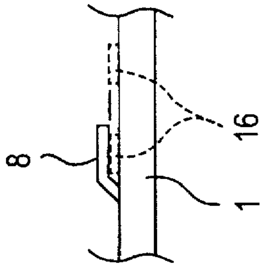
FIG. 6 is an enlarged view illustrating "B" part of FIG. 5.

By the fact that the two holes 7 formed in the outer plate 1 and the two protrusions 23 formed in the actuating piece 22 are separated from the centers of the outer plate 1 and the actuating piece 22 into a different distance, only when the hole 7 and the protrusion 23 which have a same distance from the center are put together, the protrusion 23 can be inserted into the hole 7 to fasten the actuating piece 22 to the outer plate 1; and in other cases, the protrusion 23 will not be inserted into the hole 7. This is engagement is seen in FIG. 3. Accordingly, the assembling operation of the device for maintaining the horizontality of a door lock lever of the present invention can be simplified and blind assembly is made possible.

Drawing reference numeral 30 shows a door lock lever, and drawing reference numeral 31 shows a slit formed in the door lock lever 30.

The operation of the device for maintaining the horizontality of a door lock lever in accordance with the present invention will be fully described in below:

Firstly, if the door lock lever 30 is rotated, the stopper projection 32 of the actuating plate 11, which is fitted into the slit 31 formed in the door lock lever 30, is integrally rotated with the door lock lever 30 to rotate the actuating plate 11 at the same time. Upon the rotation of the actuating plate 11, one of the two bent portions 14 which are formed in the leaf spring 10 is biased by one of the two flanges 13 formed in the actuating plate 11, and the other bent portion 14 is caught by the projection 9 of the outer plate 1 thereby the return force of the leaf spring 10 is originated. If the door lock lever 30 is released, the lever 30 is returned to an original position by the return force of the leaf spring 10.

In the device for maintaining the horizontality of a door lock lever of the present invention, since the plates 1,1*a* are manufactured by pressing steel plates; construction is simplified to lower the number of parts, manufacturing cost, and the number of processes; the assembling operation can be accomplished in an easy manner; and the possibility of breakdown of the device is minimized.

Also, because only when the door lock body 4 and the door lock lever 30 are aligned in a desired position, the protrusion 23 of the actuating piece 22 can be engaged into the hole 7 of the outer plate 1, the door lock lever 30 can be fitted to the shaft portion of the door lock body 4, if the protrusion 23 of the actuating piece 22 is engaged into the hole 7 of the outer plate 1 when the outer plate 1 is fitted onto the door lock body 4.

As mentioned above, the device for maintaining the horizontality of a door lock lever in accordance with the present invention not only has a compact structure, but also effectively maintains the door lock lever 30 in a horizontal position, whereby it is convenient to assemble the door lock and the manufacturing cost is lowered.

Although the present invention has been described and illustrated with reference to a preferred embodiment, it is to be readily understood that the present invention is not limited to the preferred embodiment, and various changes and modifications can be made without departing from the scope and spirit of the invention defined in the appended claims.

What is claimed is:

1. A lever assembly for a lever door lock comprising:

a door lock body including a body cylinder having an internally directed radial engaging projection;

a lock shank including an inside portion and an outside portion extending from said door lock body, the outside portion having an externally threaded region adjacent said body cylinder;

a retainer including an annular portion defining a central aperture for receiving the outside portion of said lock shank, said annular portion including two integral outwardly directed assembly protrusions disposed at different radial distances from said central aperture, and an inwardly directed insertion portion disposed perpendicular to a portion of said annular portion, said insertion portion having a slot adapted to engage said engaging projection to thereby lock said retainer to said lock body;

an annular outer plate having an outside face and comprising an internally threaded central aperture adapted to matingly thread onto the externally threaded region of said lock shank, a pair of biasing projections disposed on the face and directed outwardly, said projections spaced from one another at an acute angle, and two assembly apertures disposed at different radial distances from said threaded central aperture, each of said assembly apertures adapted to receive corresponding ones of said assembly protrusions of said retainer to enable blind assembly of said annular outer plate to said retainer;

a leaf spring including two bent arms seated on the outside face of said annular outer plate with each of said bent arms bearing against one of said biasing projections;

an actuating plate including an inwardly directed flange to contain said leaf spring, said actuating plate defining a central aperture for reception of the outside portion of said lock shank and including an internally directed radial stopper projection extending into the central aperture;

an outside cover assembly defining a central aperture and attached to said annular outer plate; and a door lever mounted to said cover assembly, said door lever including an inwardly directed shaft received into the central aperture of said cover assembly, said shaft including a stopper slot for engaging said stopper projection of said actuating plate to impart rotative motion of said lever to said actuating plate.

2. The lever assembly of claim 1, wherein said annular outer plate further comprises two outwardly directed locking lips disposed in diametrically opposed relation on the face to rotatingly receive annularly disposed locking tabs on said outside cover assembly.

* * * * *